United States Patent
Srivastava et al.

(10) Patent No.: US 6,549,922 B1
(45) Date of Patent: Apr. 15, 2003

(54) SYSTEM FOR COLLECTING, TRANSFORMING AND MANAGING MEDIA METADATA

(76) Inventors: Alok Srivastava, One Oracle Dr., Nashua, NH (US) 03060; Marco Carrer, One Oracle Dr., Nashua, NH (US) 03062; Paul Lin, One Oracle Dr., Nashua, NH (US) 03060

( * ) Notice: Subject to any disclaimer, the term of this patent is extended or adjusted under 35 U.S.C. 154(b) by 0 days.

(21) Appl. No.: 09/410,781

(22) Filed: Oct. 1, 1999

(51) Int. Cl.[7] .......................... G06F 12/00; G06F 15/00
(52) U.S. Cl. ....................................... 707/205; 707/512
(58) Field of Search ........................ 707/2–7, 100–101, 707/500–513, 200, 205, 522–524; 345/700–706

(56) References Cited

U.S. PATENT DOCUMENTS

| | | | |
|---|---|---|---|
| 5,920,856 A | * 7/1999 | Syeda-Mahmood | 707/3 |
| 5,970,490 A | * 10/1999 | Morgenstern | 707/10 |
| 6,170,011 B1 | * 1/2001 | Macleod Beck et al. | 709/224 |
| 6,311,194 B1 | * 10/2001 | Sheth et al. | 707/505 |

* cited by examiner

*Primary Examiner*—Alford W. Kindred

(57) ABSTRACT

An extensible framework for the automatic extraction and transformation of metadata into logical annotations. Metadata imbedded within a media file is extracted by a type-specific parsing module which is loaded and executed based on the mimetype of the media file being described. A content processor extracts information, typically in the form of time-based samples, from the media content. An auxiliary processing step is performed to collect additional metadata describing the media file from sources external to the file. All of the metadata thus collected is combined into a set of logical annotations, which may be supplemented by summary data generated from the metadata already collected. The annotations are then formatted into a standardized form, preferably XML, which is then mapped into a database schema. The database object also stores the source XML data as well as the original media file in addition to the annotation metadata. The system provides unified metadata repositories, which can then be used for indexing and searching.

10 Claims, 3 Drawing Sheets

SYSTEM FOR COLLECTING, TRANSFORMING AND MANAGING MEDIA METADATA

FIELD OF THE INVENTION

This invention relates to electronic data storage, content management and retrieval systems and more particularly to methods and apparatus for storing metadata describing multimedia data in a standardized format.

BACKGROUND OF THE INVENTION

Digital multimedia is stored in a variety of formats that are very different from alphanumeric data. While textual information supports the concepts of alphabetical ordering, indexing, and searching, media data does not. Multimedia formats are typically designed to fulfill playback rather than manageability requirements. In order to add manageability, it is common to associate text-based descriptive "metadata" or "annotations" with the media content.

In some cases, annotations can be automatically extracted from the media. Examples include time-based samples of audio or video presentations, and reduced-sized thumbnail views of image data. Many popular media formats, such as QuickTime™ from Apple Computer and Advanced Streaming Format (ASF) from Microsoft Corp., are designed to capture and store a user's text descriptions as well as system annotations, and such metadata is generally added during media creation and editing. In addition, emerging standards such as Digital Versatile Disc (DVD) and MPEG-7 support even richer metadata which facilitates the design of automated media management solutions. However, there is no unified way of capturing and using this metadata in application programs. Instead, special-purpose routines must be written by the application programmer to handle each of the wide variety of metadata storage techniques used by different proprietary media formats.

SUMMARY OF THE INVENTION

The present invention may be employed to capture metadata stored in diverse proprietary formats, as well to capture user-generated metadata and metadata from other sources, and to transform the captured metadata into logical annotations stored in a standard format. The standardized metadata allows the described digital media to be more readily managed, indexed, and searched by application programs without special programming.

In the specific embodiment of the invention described below, a media-specific metadata extracting component is used to extract metadata already stored in the media file according to the file format specifications for that particular media type. A sample extraction program program is also executed to analyze the media file to generate additional information, such as time-based file samples, which characterize the content of the file. In addition, a further routine may be executed to acquire auxiliary data from one or more sources external to the media file being described, including such sources as the Internet or keyboarded descriptions entered by the user.

As contemplated by the invention, after the metadata describing the media file is obtained, it is combined to form a set of logical annotations to the file. If desired, the resulting logical annotations may be selectively organized into summary data which may be added to the original logical annotations. The resulting logical annotations are then placed in a standard data representation, preferably extended Markup Language (XML). These annotations may then be stored, along with the original media, in a database adapted for storing XML data. The metadata which is stored in the database in this fashion may then be accessed by application programs in standard ways to perform data management, search, retrieval and playback functions.

These and other objects, features and advantages of the present invention may be better understood by considering the following detailed description of the preferred embodiment of the invention. In the course of this description, reference will frequently be made to the attached drawings.

DETAILED DESCRIPTION

In the description of a specific embodiment of the invention that follows, the term "media data" includes both digital video and audio data, and is to be distinguished from text-based data which may be readily indexed and managed by known techniques. Data which describes media data are interchangeably referred to as "metadata" and "annotations," these terms being used interchangeably to identify a collection of easily indexable and/or manipulable attributes or properties which are typically expressed in natural language text (such at media title, descriptors, copyright notices, and the like), and additional information such as time based-samples of the content of the media data being described.

The present invention provides a framework which may be used to advantage to capture, transform, process, and store metadata. This framework is extensible to allow for user-defined components to be plugged in at every step.

Figure 1:
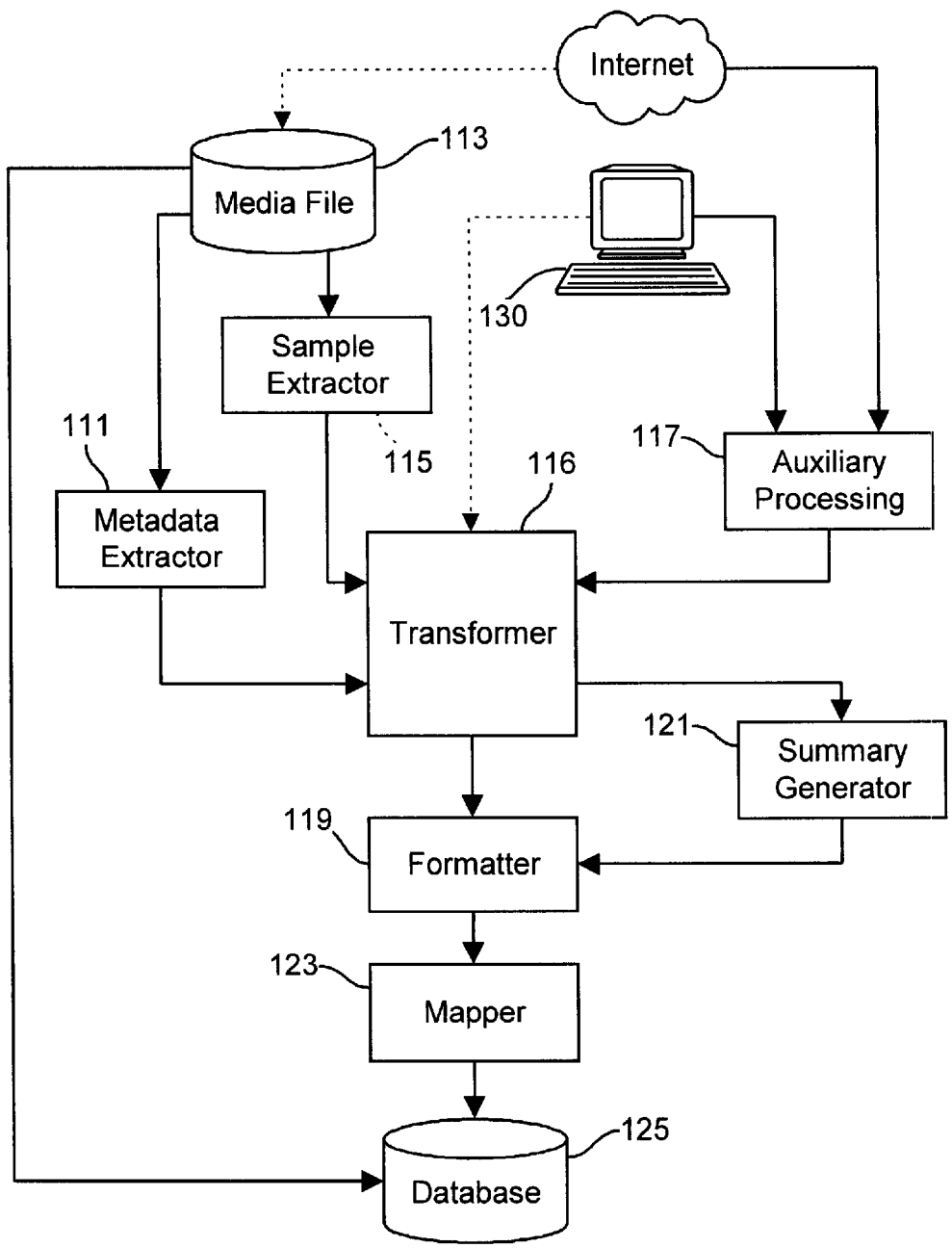
FIG. 1 is a block diagram illustrating the principle functional components used to implement the preferred embodiment of the invention.

As shown in FIG. 1, media data flows through the system along multiple paths. A metadata extractor 111 parses the file of media data 113 to extract metadata embedded within the file 113. A sample extractor 115 generates additional information, such as time-based samples, from the content of the media file 113. A transformer module 116 combines the information generated by the metadata extractor 111 and the processor 115 with additional metadata obtained from sources external to the media files being processed. This external data is gathered by an auxiliary processing step seen at 117 in FIG. 1. The transformer module 116 provides the resulting collected metadata to a formatter 119. At this stage, a summary of the media data can also be generated based on the information captured so far as indicated by the summary generator seen at 121 in FIG. 1. The formatter 119 converts the collected and generated metadata, including any summary data from the generator 121, into a standard data format, preferably the eXtended Markup Language (XML), which may then be mapped at 123 into a corresponding database schema and uploaded into the database shown at 125.

The system shown in FIG. 1 operates under the control of a client computer indicated at 130 in FIG. 1. The client computer may be used to designate a media file to be processed by supplying the media file's filename in a file system or its Internet URL. The client computer 130 may also be used to identify or accept auxiliary metadata which describes the media file being processed, the auxiliary data being accepted as a user keyboard entry or by identifying the URL of Internet data which contains externally located metadata which describes the media file 113 being processed.

The individual components seen in FIG. 1 are described in more detail in the following sections.

Client Interface

As shown in FIG. 1, the client computer 130 presents the user interface provided by the system. This user interface may be a command line interface, a graphical interface of the type illustrated in FIG. 2 to be discussed, or may take the form of one or more Java servlets. A defined API may be also used to expose the functionality of the system to client programs which provide their own user interface.

Figure 2:
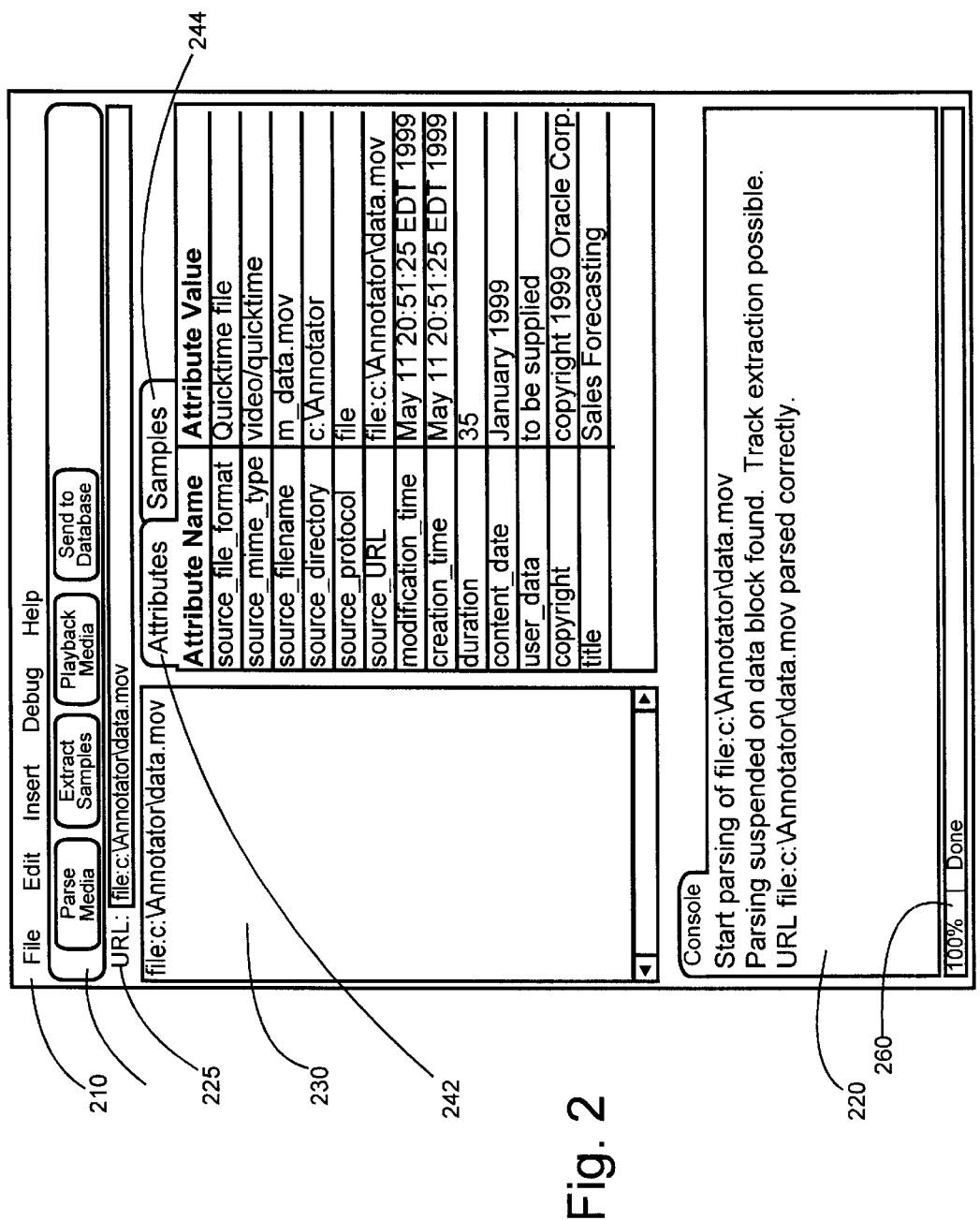
FIG. 2 is a pictorial view of graphical user interface window which is displayed by a client computer to enable a user to intiate and control program functions and to provide and edit annotation data.

An illustrative graphical user interface may employ a windowed display as shown in FIG. 2 The GUI window includes a menu bar seen at 210 which provides access to five menus: File, Edit, Insert, Debug, and Help. The File menu contains commands to open a media source file, open an annotation, save an annotation, export an annotation as XML, save the content of the console display (seen at 220), and exit the program. The Edit menu contains commands to delete a selected attribute from an extracted annotation, open a preferences window, and save changes to the user-selected preferences. Preferences can include database identification and log-in information to simplify the process of inserting annotations and media data into a selected database after processing. The Insert menu which is accessed from the Menu bar 210 contains a command to insert a new attribute and attribute value into the current annotation. The Debug menu contains a command to show the Debug Output Mode window, and the Help menu provides access to instructions and information in a help system to assist the user of the program.

The GUI window pictured in FIG. 2 includes a toolbar at 230 which contains four buttons: Parse Media, Extract Samples, Playback Media, and Send to Database. The Parse Media button parses the media file which is currently pointed to by the URL specified in the URL bar 225. Pressing (clicking on) the Extract Samples button extracts media samples from the media source file using the content processor seen at 115 in FIG. 1. Pressing the Playback Media button plays the selected media file or extracted sample using an associated "helper" application (typically registered with the operating system for playing media files of a particular mimetype). The Send to Database button starts a routine which guides the user through the process of mapping the annotations into a selected database schema and uploading the media file and its associated XML annotations into the selected database. Before annotations can be uploaded into the database, tables are typically created in accordance with a schema which corresponds to the elements of the XML annotation data which will be used to access and manage the media. In most relational database systems, the needed database tables may typically be created using SQL Create Table statements which specify the schema to be used.

The GUI window as seen in FIG. 2 further includes a URL bar at 225 which contains two pieces of information: the protocol used to parse the media source (such as "file," "http" or "cd") and the location of the media source to be parsed. Note that the URL used to locate audio CDs from a CD media source is not a standard URL but rather uses a special syntax which permits the program to access data on a CD drive through the operating system. For example, using the Sun Solaris OS, the URL entered for a CD takes the form "cd:/vol/dev/aliases/cdrom0#cdda" whereas, under Windows NT, it would have the form cd:[Windows CD-ROM drive]#cdda"

The Annotations pane at 230 shows the URL protocol and name of the source media file described by the current annotation. This pane also contains an expandable list containing the hierarchy of annotations and sub-annotations. The types of the annotations and sub-annotations are shown in the Annotations pane.

Figure 3:
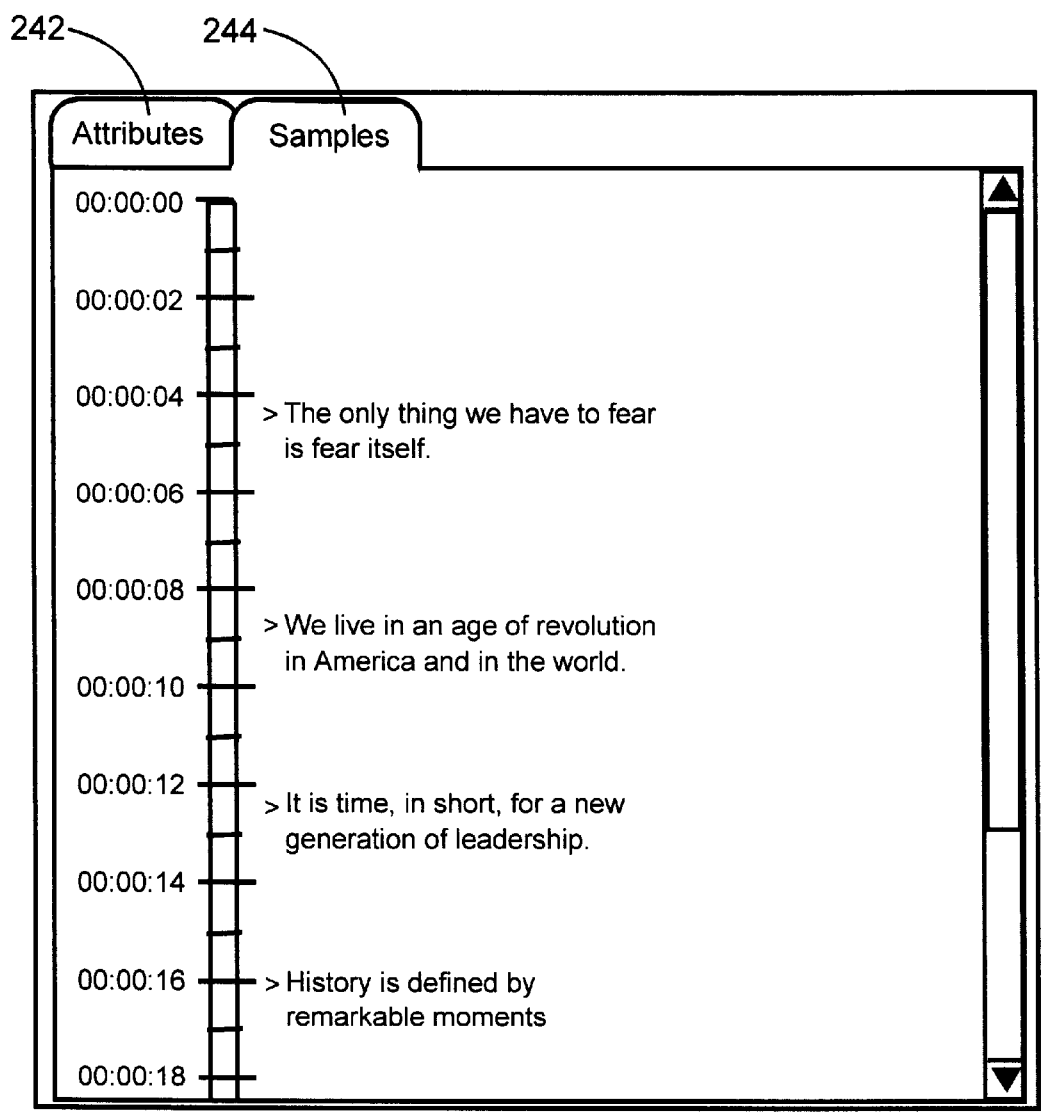
FIG. 3 is a pictorial view of a sample data viewing pane which is displayed in one portion of the window shown in FIG. 2.

The GUI window depicted in FIG. 2 includes two tab-selected panes for displaying and editing attributes and samples. The pane selected by clicking on the Attributes tab at 242 shows the attributes of the annotation that have values, along with their values. The user can add attributes to the extracted annotation or change the attribute values. The Samples tab at 244 selects a samples display pane (seen in FIG. 3 but not shown on FIG. 2) which displays the text of a text sample laid out on a timeline.

The console panel shown at 220 in FIG. 2 displays messages pertaining to the status of the program's operations. If an error occurs, notification is printed to the console window, along with notification of any action that is taken by the program. The console list can be saved to a file, as noted above, using the File menu in the Menu bar at 210.

A status bar seen at 260 contains a field that tracks how much of an operation is completed, from 0% to 100%.

Metadata Extraction

The metadata extractor seen at 111 in FIG. 1 extracts metadata embedded in the digital media according to the file format specifications for the particular type of media file 113 being processed. The type-specific file format specifications define the structure of the file and indicate where metadata of interest is located within the file, allowing it to be extracted by the metadata extractor 111 and passed to the transformer 116. The mimetype of the media source (typically indicated by its filename extension) may be used to dynamically load and execute an appropriate, type-specific metadata extraction module adapted to extract desired metadata from media files of the identified mimetype. A set of standard metadata extraction modules for use with widely used media types may be extensibly augmented by additional, user-defined metadata extractors which may be "plugged into" the framework at run-time, thereby extending the range of media formats handled by the system.

The metadata extractor 111 creates sub-annotations for different parts of the media being processed. When, for example, the metadata extractor 111 processes a CD containing a movie, the extractor creates three separate logical annotations: a video annotation, an audio annotation and a text annotation. These annotations appear in a hierarchical listing on the annotation pane 230 seen in FIG. 2 as follows:

CD Movie File Identification
        Movie_Annotation
            Video_Annotation
            Audio_Annotation
            Text_Annotation Sample Extractor The sample extraction program 115 is responsible for generating additional information by analyzing the actual media content. The output of this engine is often a set of time-based. samples as illustrated by the text samples seen on the samples pane in FIG. 3. Examples of content descriptive metadata created by the processing engine 115 include closed-captioning text, thumbnail images, embedded links (URL flipping), and sample video and audio "clips." Collectively this information can be viewed as a set of time-based snapshots of the media. Consequently, advanced queries can be performed, producing results with time stamps which can then be used to seek to specific positions within the media. The samples pane 244 in the GUI interface window permits the text based samples, which are displayed along a time base which indicates their timed position within the media presentation, may also be entered and edited by the user during auxiliary processing as next discussed.

Auxiliary Metadata Processing

Auxiliary metadata sources provide the information which is not obtainable by processing the media itself. For example, audio compact discs do not carry any meta-information along with the physical media; it is therefore necessary to gather metadata from auxiliary sources such as user's input, or from look-up services available on the Internet. The invention facilitates this data gathering function by establishing predetermined, standardized metadata content which is gathered during the auxiliary processing step indicated at 117, as discussed later.

Transformation

The transformer 116 combines the media information collected thus far to construct unified logical annotations which contain attribute value pairs, as well as time-based samples, describing the media. For example, the logical annotation for an audio compact disc will feature attributes such as the title, artist, duration, and number of tracks as well as audio clips for each track. The primary task performed by the transformer 116 is organizing the set of captured attributes and partitioning them semantically into such predetermined logical annotations.

This structuring of the metadata provides a facilitated method of managing the media. In particular, the effect of such a transformation is an abstraction layer above the diverse multitude of media formats. The client of annotations is shielded from having to understand the format and storage specifications of the original media source. It is thus becomes possible to manage the data in a semantically rich manner. The system provides a predefined set of annotations, but these annotations can be overridden or replaced with a completely new set. Similar to manner in which type-specific metadata extractors are loaded and executed, annotations are dynamically loaded based upon the mimetype of the media being processed.

The predefined set of media annotations are listed below. Each consists of a value pair consisting of an attribute identifier and a value. In the list below, each identifier is listed along with a description of the value data that is associated with each identifier.

| Predefined Annotations | |
|---|---|
| Attribute | Description |
| *Media Annotation* | |
| MA_TITLE | Title of the media |
| MA_COPYRIGHT | Copyright information of the media |
| MA_PRODUCER | Producer of the media |
| MA_DURATION | Duration (in seconds) of the media |
| MA_CONTENT_DATE | Creation date of the media content |
| MA_MODIFICATION_TIME | Modification time of type Java.lang.Date |
| MA_CREDITS | Credits for content providers |
| MA_SIZE | Size of the media |
| MA_FORMAT_ENCODING | Format of the media |
| MA_USER_DATA | String containing all user data |
| MA_LANGUAGE | Language of the media |
| MA_BITRATE | Bitrate of the media (in bits/second) |
| MA_CATEGORY | Media category/genre |
| MA_SOURCE_URL | Location/URL of the parsed media source |
| MA_SOURCE_PROTOCOL | URL protocol of the media source |
| MA_SOURCE_MIME_TYPE | MIME type of the media and its samples |
| MA_SOURCE_DIRECTORY | Directory where the source is stored |
| MA_SOURCE_FILENAME | Filename of the source |
| MA_SOURCE_FILE_FORMAT | Media file format |
| MA_AUTHORING_TOOL | Software tool used to create the media |
| *Audio Annotation* | |
| AA_AUDIO_ARTIST | Main artist for the audio clip |
| AA_AUDIO_BITS_PER_SAMPLE | Number of bits per sample |
| AA_AUDIO_SAMPLE_RATE | Audio sample rate (in samples/second) |
| AA_AUDIO_NUM_CHANNELS | Number of audio channels |
| *Video Annotation* | |
| VA_VIDEO_FRAME_RATE | Video frame rate (in frames/second) |
| VA_VIDEO_FRAME_SIZE | Video frame size (in bytes) |
| VA_VIDEO_SRC_HEIGHT | Video height (in pixels) |
| VA_VIDEO_SRC_WIDTH | Video width (in pixels) |
| VA_VIDEO_HORIZONTAL_RES | Horizontal resolution (in pixels/inch) |
| VA_VIDEO_VERTICAL_RES | Vertical resolution (in pixels/inch) |
| VA_VIDEO_IS_GRAYSCALE | Whether the video has colors |
| VA_VIDEO_DEPTH | Number of bits for the color depth |
| *Text Annotation* | |
| TA_TEXT_SIZE | Point size of the text track |

-continued

| Predefined Annotations | |
|---|---|
| Attribute | Description |
| TA_TEXT_BG_COLOR | Background color (0x0000RRRRGGGGBBBB) |
| TA_TEXT_FG_COLOR | Foreground color (0x0000RRRRGGGGBBBB) |
| TA_TEXT_ALIGN | Left, center, right, or justified |
| TA_TEXT_FONTNAME | Name of the font used |
| TA_TEXT_FONTFACE | Font styles used (such as italics or boldface) |
| TA_TEXT_DEF_BOX | Default text box size |
| Movie Annotation | |
| MVA_MOVIE_DIRECTOR | Director of the movie |
| MVA_MOVIE_CAST | Names of the performers in the movie |
| Audio CD Annotation | |
| ACDA_AUDIO_CD_ARTIST | Main artist of the CD |
| ACDA_AUDIO_CD_NUM_OF_TRACKS | Number of tracks on the CD |
| ACDA_AUDIO_CD_ID | CD identifier |
| ACDTA_AUDIO_CD_TRACK_CDID | CD identifier (in track sub_annotation) |
| ACDTA_AUDIO_CD_TRACK_ALBUM | Audio CD title |
| ACDTA_TRACK_ID | Track identifier within the audio CD |
| ACDTA_AUDIO_CD_TRACK_LBA | Logical block address of the track |
| ACDTA_AUDIO_CD_TRACK_MINUTE | Starting minute of the track |
| ACDTA_AUDIO_CD_TRACK_SECOND | Starting second of the track |
| ACDTA_START_FRAME | Starting frame of the track |

Not all media files will provide values for every attribute in the predefined set. However, the user can use employ the GUI window seen in FIG. 2 to add a value to an annotation for any attribute that does not have a value, or to edit a value already present.

Note that the program cannot write any new attribute values back to the media files. The current annotation will contain the value, but any annotations created later will not contain the new value. To add a value for an attribute that has not been automatically set during metadata extraction or during the operation of the content processor 115, the user need only perform the following operations during auxiliary processing (step 117 in the FIG. 1):

1. From the Insert menu, select Attribute. A blank table row will appear in the Annotations tab.
2. Click the left-hand table cell of the new row. A pop-up menu will appears. This window contains the names of all attributes that do not have values.
3. Select an attribute from the pop-up menu.
4. Enter a value in the right-hand table cell.

Summary Generator

Logical annotations can be processed to generate a summary of the media. The summary generator 121 accomplishes this task according to user's specified guidelines. For example, a song can be summarized by grouping together previously extracted or collected metadata, such as the performer's name, the song title, and a song clip. Such summaries are especially useful for quick browsing of media catalogs.

Formatter

The formatter 119 is responsible for transforming the logical annotations as well as the summaries into a form which is searchable and manageable by databases. A well-defined XML structure is used to store this information, hence a unified representation for the metadata is achieved.

Database Mapper

Database mapping constitutes the final step of the transformation chain and finally completes the database population process. During this step, seen at 123 in FIG. 1, the system uploads the media and the associated XML document, produced by the formatter 119, into a database which supports the storage of data expressed in XML. Preferably, the media file itself is also stored along with the metadata in the same database. By way of example, the Oracle 8i™ database available from Oracle Corporation, Redwood Shores, Calif., and the media support offered by Oracle interMedia™, allows for simultaneous storage of the actual media data and its corresponding metadata. See "Oracle8i interMedia Audio, Image, and Video User's Guide and Reference." Release 8.1.,5 Oracle Corporation (A67299-01), 1999.

The database mapper 123 maps the elements of the XML "documents" which contain the logical annotation metadata into the corresponding schema used by the database for storing, indexing, searching and managing the media and its metadata. The physical properties captured in a logical annotation are mapped into the fields of a database object. In addition, the XML representation, which includes content attributes obtained by the content processor 115, may also stored within the database object. In addition to allowing the media source file to be stored with the metadata, a pointer to (the URL of) the media resource may be stored instead when it does not make sense for the whole media source to be stored. As a result, a self-contained repository, for the media data and its description, is created in the database. This repository can now be indexed with conventional indexing techniques, enabling advanced searches on the multimedia data.

Media Playback

The program operated from the GUI interface seen in FIG. 2 is also capable of playing media source files and extracted media samples. However, in order to play such files, the user may need to install some helper applications for playing the desired media type. Typical helper applications for the Windows environment include the Microsoft Windows Media Player, the QuickTime 4.0 for Windows from Apple Computer, RealPlayer from RealNetworks, Inc. and WinAmp from Nullsoft, Inc. Helper applications which operate in the Sun Solaris environment are the Java Media Framework (JMF) player and XAnim (freeware available from Mark Podlipec, 15 Meadow Lane, Shrewsbury Mass. 01545 USA).

Conclusion

It is to be understood that the specific embodiment of the invention which has been described is merely illustrative of one application of the principles of the invention. Numerous modifications may be made to the system described without departing from the true spirit and scope of the invention.

What is claimed is:

1. The method for storing multimedia data comprising, in combination, the steps of:

determining the particular media type of a file of data to be stored, selecting and executing a metadata extracting program to extract metadata stored in said file of data in accordance with the file format specifications for said particular media type, selecting and executing a sample extraction program for analyzing the content of said file of data to generate additional information characterizing the content of said file, selecting and executing a program for acquiring auxiliary data characterizing said file of data from one or more sources other than said file of data, combining said metadata, said additional information and said auxiliary data for form a set of logical annotations to said file of data, formatting said logical annotations into a standard data representation, and storing the combination of said file of data and logical annotations in a database.

2. The method set forth in claim 1 wherein said additional information generated by said sample extraction program includes time-based samples of said file of data.

3. The method set forth in claim 1 wherein one of said sources of auxiliary data include data provide by user characterizing said file of data.

4. The method set forth in claim 1 wherein said standard data representation is the eXtended Markup Language.

5. The method set forth in claim 1 including the further step of processing said logical annotations to produce summary data which is combined with said logical annotations and formatted into said standard data representation.

6. Apparatus for collecting and storing metadata describing a plurality of media data files of different types having different format specifications comprising, in combination, means for extracting imbedded metadata from each of said media data files, means for processing the content of each of said media data files to produce information representing said content, means for accepting external data describing at least selected ones of said files from sources other than said selected ones of said data files, means for combining said imbedded data, said information representing said content, and said external data to form logical annotation data associated with each of said media data files, and means for storing said logical annotation data in a standard data format.

7. Apparatus as set forth in claim 6 wherein said information representing said content includes one or more time-based samples of the content of at least some of said media files.

8. Apparatus as set forth in claim 7 further including means for processing said logical annotation data to produce summary data which is stored with said logical annotation data in said standard data format.

9. Apparatus as set forth in claim 6, wherein said standard data format is the eXtensible Markup Language.

10. Apparatus as set forth in claim 6, wherein said means for storing said logical annotation data in a standard data format includes means for mapping at least a portion of said annotation data into a database schema and uploading said portion of said annotation data into a database in accordance with said schema.

* * * * *